(12) United States Patent
Mizukoshi et al.

(10) Patent No.: US 11,728,484 B2
(45) Date of Patent: Aug. 15, 2023

(54) NON-AQUEOUS ELECTROLYTE SECONDARY BATTERY

(71) Applicant: Panasonic Intellectual Property Management Co., Ltd., Osaka (JP)

(72) Inventors: Fumikazu Mizukoshi, Tokushima (JP); Takamitsu Tashita, Tokushima (JP); Takuya Shinomiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 15/734,025

(22) PCT Filed: Jun. 4, 2019

(86) PCT No.: PCT/JP2019/022065
§ 371 (c)(1),
(2) Date: Dec. 1, 2020

(87) PCT Pub. No.: WO2019/239948
PCT Pub. Date: Dec. 19, 2019

(65) Prior Publication Data
US 2021/0226213 A1 Jul. 22, 2021

(30) Foreign Application Priority Data
Jun. 15, 2018 (JP) .................. 2018-114646

(51) Int. Cl.
*H01M 4/587* (2010.01)
*H01M 4/36* (2006.01)
(Continued)

(52) U.S. Cl.
CPC .......... *H01M 4/587* (2013.01); *H01M 4/364* (2013.01); *H01M 10/0525* (2013.01); *H01M 2004/021* (2013.01); *H01M 2004/027* (2013.01)

(58) Field of Classification Search
CPC ......... H01M 4/583; H01M 4/362–364; H01M 10/0525; H01M 2004/021; H01M 2004/027
See application file for complete search history.

(56) References Cited

U.S. PATENT DOCUMENTS 5,677,082 A 10/1997 Greinke et al.
2012/0037845 A1 2/2012 Yamamoto et al.

FOREIGN PATENT DOCUMENTS

EP 3297073 A1 3/2018
JP 9-320600 A 12/1997
(Continued)

OTHER PUBLICATIONS

International Search Report dated Aug. 13, 2019, issued in counterpart application No. PCT/JP2019/022065 (2 pages).

*Primary Examiner* — Milton I Cano
*Assistant Examiner* — Oscar Londono
(74) *Attorney, Agent, or Firm* — WHDA, LLP

(57) ABSTRACT

A non-aqueous electrolyte secondary battery capable of suppressing an increase in man-hour for a compression process in the production of a negative electrode and also suppressing a deterioration in charge/discharge cycle characteristics is provided. A non-aqueous electrolyte secondary battery according to one embodiment of the present disclosure is provided with a negative electrode having a negative electrode active material layer, wherein: the negative electrode active material layer includes graphite particles A and graphite particles B as a negative electrode active material; the internal porosity of the graphite particles A is 5% or less, (Continued)

and the internal porosity of the graphite particles B is 8-20%; and the mass ratio of the graphite particles A to the graphite particles B is 70:30 to 90:10.

2 Claims, 2 Drawing Sheets

(51) Int. Cl.
*H01M 10/0525* (2010.01)
*H01M 4/02* (2006.01)

(56) References Cited

FOREIGN PATENT DOCUMENTS

| | | |
|---|---|---|
| JP | 2014-067638 A | 4/2014 |
| WO | 2010/007898 A1 | 1/2010 |

NON-AQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery including a carbon material used as a negative electrode active material is widely used as a secondary battery having a high energy density.

For example, Patent Literature 1 discloses a non-aqueous electrolyte secondary battery including densified carbon used as a carbon material, the densified carbon having a porosity due to closed pores of 5% or less.

For example, Patent Literature 2 discloses a non-aqueous electrolyte secondary battery including carbon materials including a carbon material A having a porosity due to closed pores of 1% or more and less than 23% and a carbon material B having a porosity due to closed pores of 23% or more and 40% or less.

CITATION LIST

Patent Literature

PATENT LITERATURE 1: Japanese Unexamined Patent Application Publication No. H9-320600
PATENT LITERATURE 2: Japanese Unexamined Patent Application Publication No. 2014-67638

SUMMARY

In view of improved reliability of a non-aqueous electrolyte secondary battery, suppression of deterioration in charging/discharging cyclic characteristics is required.

A negative electrode of a non-aqueous electrolyte secondary battery is obtained by applying a slurry including a carbon material as a negative electrode active material to a negative electrode current collector, drying the resulting coating, and compressing the resulting coating (negative electrode active material layer). However, there is a problem; specifically, it is necessary to carry out the compression a plurality of times according to the porosity due to closed pores of the carbon material, for obtaining a negative electrode active material layer having a high packing density. The increase in the number of times of the compression may lead to reduction in productivity of batteries.

It is an advantage of the present disclosure to provide a non-aqueous electrolyte secondary battery that can be produced without an increase in the number of times of the compression in manufacturing the negative electrode and can also achieve suppression of deterioration in charging/discharging cyclic characteristics.

A non-aqueous electrolyte secondary battery of one aspect of the present disclosure comprises a negative electrode having a negative electrode active material layer, the negative electrode active material layer including graphite particles A and graphite particles B each as a negative electrode active material,
wherein the graphite panicles A have a porosity due to closed pores of 5% or less, and the graphite particles B have a porosity due to closed pores of 8% to 20%, and
a mass ratio between the graphite particles A and the graphite particles B is 70:30 to 90:10.

According to one aspect of the present disclosure, there can be provided a non-aqueous electrolyte secondary battery that can be produced without an increase in the number of times of the compression in manufacturing the negative electrode and can also achieve suppression of deterioration in charging/discharging cyclic characteristics.

Figure 1:
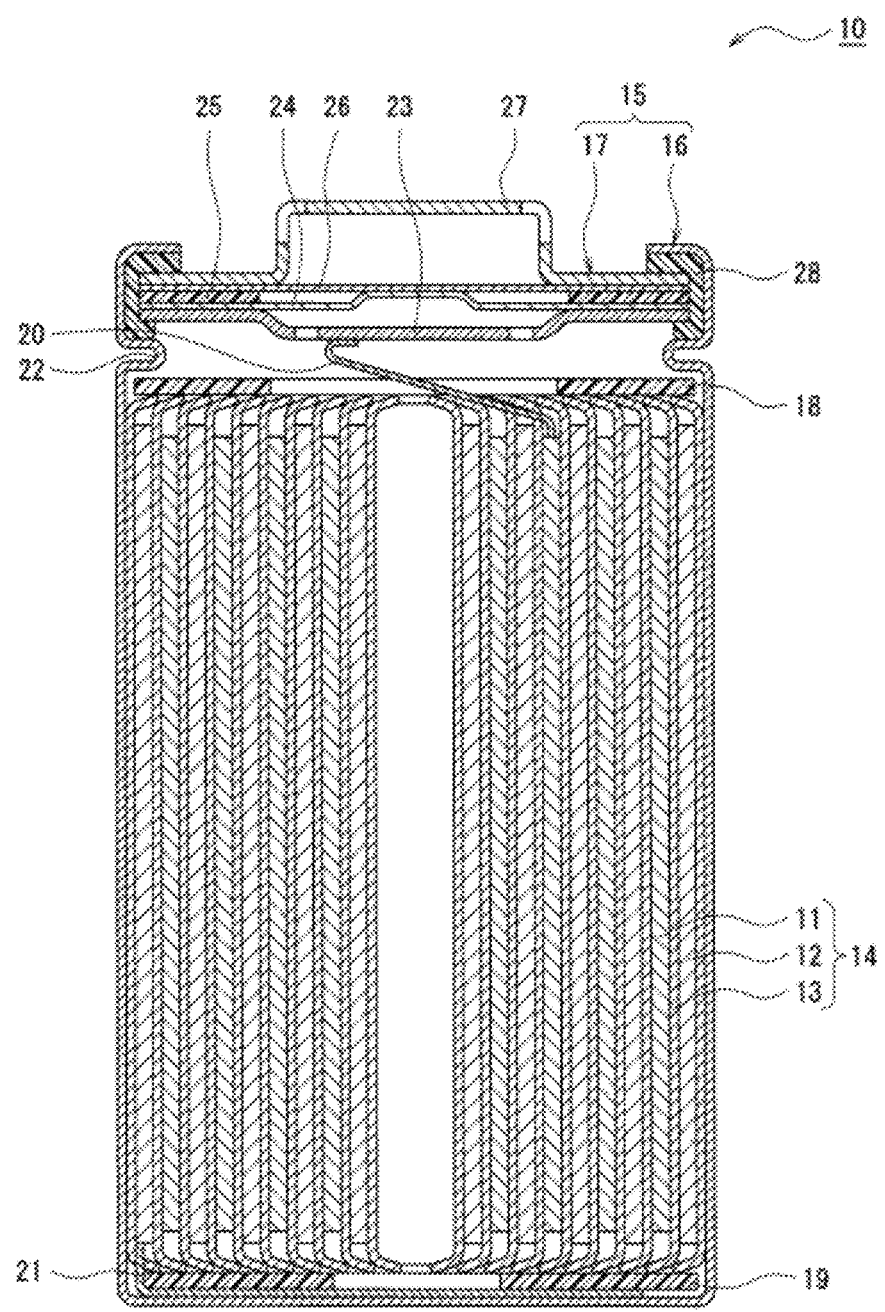
FIG. 1 is a sectional view illustrating a non-aqueous electrolyte secondary battery of an exemplary embodiment.

DESCRIPTION OF EMBODIMENTS (Basic Findings of Present Disclosure)
Breakage of graphite particles due to charging/discharging cycles and a subsequent decomposition reaction of a non-aqueous electrolyte, for example, are prevented in the graphite particles having a small porosity due to closed pores to result in a tendency to suppress deterioration in charging/discharging cyclic characteristics of a non-aqueous electrolyte secondary battery, as compared to graphite particles having a large porosity due to closed pores. However, graphite particles having a small porosity due to closed pores are difficult to col sc by compression accordingly, it is necessary to carry out the above-described compression a plural times in manufacturing the negative electrode, for obtaining a negative electrode active material layer having a high packing density. Then, the present inventors have studied diligently, and as a result, have found that for providing a non-aqueous electrolyte secondary battery that can be produced using graphite particles having a small porosity due to closed pores without an increase in the number of times of the compression in manufacturing the negative electrode and that can also achieve suppression of deterioration in charging/discharging cyclic characteristics, it is necessary to mix the graphite particles having a small porosity due to closed pores with graphite particles having a large porosity due to closed pores in a specific ratio. Thus, the present inventors have reached the non-aqueous electrolyte secondary battery of the aspect shown below.

The non-aqueous electrolyte secondary battery of one aspect of the present disclosure comprises a negative electrode having a negative electrode active material layer, the negative electrode active material layer including graphite particles A and graphite particles B each as a negative electrode active material,
wherein the graphite particles A have a porosity due to closed pores of 5% or less, and the graphite particles B have a porosity due to closed pores of 8% to 20%, and
a mass ratio between the graphite particles A and the graphite particles B is 70:30 to 90:10.

When the negative electrode active material layer including the graphite particles A having a porosity due to closed pores of 5% or less and the graphite particles B having a porosity due to closed pores of 8% to 20% in a mass ratio of 70:30 to 90:10 is compressed with a mill roll or the like in the manufacturing process, the graphite particles B are moderately collapsed so that the graphite particles B are present in voids between the graphite particles A, which are difficult to collapse, and thus, the packing density easily becomes high without an increase in the number of times of the compression. If the ratio of the graphite particles A is higher than the above described range, an increase in the number of times of the compression is necessary for reducing the voids between the graphite particles A, and accordingly a high packing density cannot be obtained. The presence of the graphite particles A, which have a porosity due to closed pores of 5% or less, in the above-described ratio in the negative electrode active material layer suppresses deterioration in charging/discharging cyclic characteristics. It is possible that not only the presence of the graphite particles A, which have a porosity due to closed pores of 5% or less, but also increase in the contact rate of the graphite particles (A, B) with each other due to the presence of the graphite particles B in the voids between the graphite particles A are causes of the suppressing effect on deterioration in charging/discharging cyclic characteristics. Furthermore, the graphite particles B, which have a porosity due to closed pores of 8% to 20%, retain a large amount of a non-aqueous electrolyte; accordingly, a certain amount of a non-aqueous electrolyte is retained in the negative electrode active material layer due to the presence of the graphite panicles B in the negative electrode active material layer, and the contact of the graphite particles (A, B) with the non-aqueous electrolyte is sufficiently ensured. It is possible that this is also one of the causes of the suppressing effect on deterioration in charging/discharging cyclic characteristics. If the ratio of the graphite particles B is higher than the above described range, breakage of the graphite particles in charging/discharging cycles and the subsequent decomposition reaction of the non-aqueous electrolyte abundantly occur, for example, and it is thus difficult to sufficiently suppress deterioration in charging/discharging cyclic characteristics.

Hereinafter, exemplary embodiments will be described in detail with reference to drawings. However, the non-aqueous electrolyte secondary battery of the present disclosure is not limited to the embodiments described hereinbelow. The drawings which are referred in the description of the embodiments are schematically illustrated.

FIG. 1 is a sectional view of a non-aqueous electrolyte secondary battery of an exemplary embodiment. The non-aqueous electrolyte secondary battery 10 shown in FIG. 1 comprises: an electrode assembly 14 having a wound structure in which a positive electrode 11 and a negative electrode 12 are wound together with a separator 13 interposed therebetween; a non-aqueous electrolyte; insulating plates 18 and 19 respectively disposed on the upper and lower sides of the electrode assembly 14; and a battery case 15 housing these members. The battery case 15 is constituted of a cylindrical case body 16 having a closed-end and a sealing assembly 17 for closing the opening of the case body 16. Alternatively to the electrode assembly 14 having a wound structure, an electrode assembly in another form may be applied, including an electrode assembly having a laminate structure in which positive electrodes and negative electrodes are laminated alternately with separators interposed therebetween. Examples of the battery case 15 include a metallic package can having a cylindrical shape, a rectangular shape, a coin shape, a button shape, or another shape, and a package pouch formed by laminating a metal sheet with a resin sheet.

The case body 16 is, for example, a cylindrical metallic package having a closed-end. A gasket 28 is provided between the case body 16 and the sealing assembly 17 to ensure that the battery case is tightly sealed. The case body 16 includes a projecting portion 22 formed by, for example, pressing the lateral surface from outside to support the sealing assembly 17. The projecting portion 22 is preferably formed annularly along the circumferential direction of the case body 16, and the upper surface thereof supports the sealing assembly 17.

The sealing assembly 17 includes the filter 23, a lower vent member 24, an insulating member 25, an upper vent member 26, and a cap 27, these members being piled in this order from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at their middle portions and the insulating member 25 is interposed between their circumferences. If the internal pressure of the non-aqueous electrolyte secondary battery 10 increases by heat generation due to, for example, internal short, the lower vent member 24 changes its shape so as to, for example, push up the upper vent member 26 toward the cap 27, and the lower vent member 24 thus ruptures to break the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a through-hole in the insulating plate 18 and extends toward the sealing assembly 17, and a negative electrode lead 21 attached to the negative electrode 12 extends on the outside of the insulating plate 19 to the bottom side of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal.

Component elements of the non-aqueous electrolyte secondary battery 10 will be described in detail below.

[Negative Electrode]

The negative electrode 12 comprises metal foil or the like as a negative electrode current collector and a negative electrode active material layer formed on the current collector. As the negative electrode current collector, foil of a metal that is stable in the electric potential range of the negative electrode, such as copper, a film with such a metal disposed as an outer layer, or the like is used. The negative electrode active material layer includes a negative electrode active material including graphite particles. The negative electrode active material layer preferably includes a binder or the like.

Figure 2:
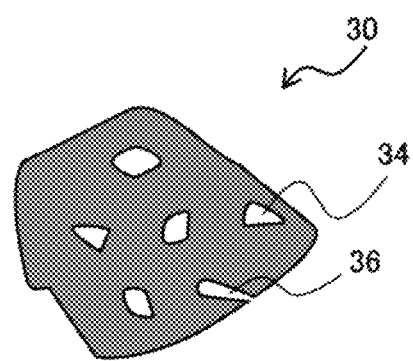
FIG. 2 is a schematic enlarged view showing the section of a graphite particle in the negative electrode active material layer.

FIG. 2 is a schematic enlarged view showing the section of a graphite particle in the negative electrode active material layer. As shown in FIG. 2, the graphite particle 30 includes a pore 34 that is closed and does not reach any particle surface from the inner part of the particle (hereinafter, referred to as a closed pore 34), and a pore 36 which reaches a particle surface from the inner part of the particle (hereinafter, referred to as an open pore 36) in the sectional view of the graphite particle 30.

The graphite particles 30 in the present embodiment include graphite particles A having a porosity due to closed pores of 5% or less and graphite particles B having a porosity due to closed pores of 8% to 20%. In view of, for example, suppression of deterioration in charging/discharging cyclic characteristics, the graphite particles A have a porosity due to closed pores of 5% or less, preferably 1% to 5%, and more preferably 3% to 5%. In view of, for example, ease of compression of the negative electrode active material layer, the graphite particles B have a porosity due to closed pores of 8% to 20%, preferably 10% to 18%, and more preferably 12% to 16%. The porosity due to closed pores of the graphite particles is a two-dimensional value, and is the ratio of the area of the closed pores 34 in the graphite particles to the area of the cross section of the graphite particles. The porosity due to the closed pores in the graphite particles can be determined in the following manner.

<Method for Determination of Porosity Due to Closed Pores>

(1) A cross section of a negative electrode active material is exposed. The method for exposing the cross section may be, for example, a method including cutting out a part of a negative electrode and processing the resultant with an ion-milling machine (e.g., IM4000PLUS, manufactured by Hitachi High-Tech Corporation) to expose a cross section of the negative electrode active material layer.

(2) A backscattered electron image of the exposed cross section of the negative electrode active material layer is taken using a scanning electron microscope. The magnification for taking the backscattered electron image is 3000× to 5000×.

(3) The obtained image of the cross section is imported into a computer, and a binarization process is carried out using an image analysis soft (e.g., ImageJ, manufactured by National Institutes of Health, US) to obtain a binarized image in which the color of the cross sections of particles and the color of pores present in the cross sections of the particles in the image of the cross section are converted to black and white, respectively.

(4) Graphite particles A, B having a particle size of 5 μm to 50 μm are selected in the binarized image and the area of the cross section of the graphite particle and the area of the closed pores present in the cross section of the graphite particle are calculated. The area of the cross section of a graphite particle here refers to the area of the region surrounded by the outer circumference of the graphite particle, i.e., the whole area of the cross section of the graphite particle. Among pores present in the cross section of a graphite particle, a pore having a width of 3 μm or less may be difficult to identify as either a closed pore or an open pore in the image analysis, and therefore, a pore having a width of 3 μm or less may be regarded as a closed pore. Then, from the area of the cross section of a graphite particle and the area of the closed pores in the cross section of the graphite particle calculated, the porosity due to closed pores of the graphite particle (the area of the closed pores in the cross section of the graphite particle×100/the area of the cross section of the graphite particle) is calculated. The average of ten particles of the graphite particles A and the average of ten particles of the graphite particles B are taken as the porosity due to the closed pores of the graphite particles A and that of the graphite particles B, respectively.

The graphite particles A, B are manufactured in the following manner, for example.

<Graphite Particles A with Porosity Due to Closed. Pores of 5% or Less>

For example, coke (precursor) as a main raw material is crushed into a predetermined size, and the resultant in an aggregated state with a binder is fired at a temperature of 2600° C. or higher to graphitize, followed by sieving to thereby obtain graphite particles A having a desired size. The porosity due to closed pores can be controlled to 5% or less by, for example, the particle size of the precursor after ° rushing and the particle size of the precursor in an aggregated state. For example, the average particle size (median diameter D50) of the precursor after crushing is preferably within a range from 12 μm to 20 μm. For a smaller porosity due to closed pores within a range of 5% or less, the particle size of the precursor after crushing is preferably larger.

<Graphite Particles B with Porosity Due to Closed Pores of 8% to 20%>

For example, coke (precursor) as a main raw material is crushed into a predetermined size, and the resulting coke is aggregated with a binder. The resultant is further press-molded into a block shape and fired at a temperature of 2600° C. or higher to graphitize. The molded product in a block shape after graphitization is crushed and sieved to thereby obtain graphite particles B having a desired size. The porosity due to closed pores can be controlled to 8% to 20% by the amount of the volatile components included in the molded product in a block shape. In the case where a part of the binder added to the coke (precursor) volatilizes upon firing, the binder can be used as a volatile component. Examples of such a binder include pitch.

Examples of the graphite particles A and B used in the embodiment includes, but not particularly limited to, natural graphite and artificial graphite, and artificial graphite is preferred in view of, for example, ease of controlling the porosity due to closed pores. For the graphite particles A and B used in the embodiment, the lattice spacing ($d_{002}$) of (002) plane in wide-angle X-ray diffraction is preferably 0.3354 nm or more, more preferably 0.3357 nm or more, and preferably less than 0.340 nm, more preferably 0.338 nm or less, for example. For the graphite particles A and B used in the embodiment, the crystallite size (Lc(002)) determined by X-ray diffraction is preferably 5 nm or more, more preferably 10 nm or more, and preferably 300 nm or less, more preferably 200 nm or less, for example. In the case where the lattice spacing ($d_{002}$) and the crystallite size (Lc(002)) are within the respective ranges described above, the battery capacity of the non-aqueous electrolyte secondary battery tends to be larger as compared to the case where they are out of the above-described ranges.

For example, the negative electrode 12 can be produced by preparing a negative electrode mixture slurry including a negative electrode active material including the graphite particles A and B, a binder, and other components, applying the negative electrode mixture slurry to a negative electrode current collector, drying the resultant coatings to form negative electrode active material layers, and then carrying out compression by compressing the negative electrode active material layers with a mill roll or the like. In the present embodiment, the negative electrode active material includes the graphite particles A and graphite particles B in a mass ratio of 70:30 to 90:10. The negative electrode active material layer including the graphite particles A and graphite particles B in a mass ratio within the above described range is likely to have a high packing density through compression with a mill roll or the like, as described hereinbefore, and thus can prevent an increase in the number of times of the compression in manufacturing the negative:electrode. The mass ratio between the graphite particles A and graphite particles B is preferably 70:30 to 85:15, and more preferably 70:30 to 80:20, in view of obtaining a high packing density without an increase in the number of times of the compression in manufacturing the negative electrode, for example.

The packing density of the negative electrode active material layer is preferably 1.2 g/cm$^3$ to 1.7 g/cm$^3$ and more preferably 1.5 g/cm$^3$ to 1.7 g/cm$^3$, in view of securing the strength of the negative electrode active material layer and obtaining favorable battery characteristics, for example. If the mass ratio, graphite particles A/graphite particles B, is more than 90/10, it is necessary to increase the number of times of the compression of the negative electrode active material layer compared to the case of the mass ratio of 90/10 or less, for obtaining the negative electrode active material layer having the packing density within the range described above. If the mass ratio, graphite particles A/graphite particles B, is less than 70/30, a negative electrode active material layer having a packing density within the above-described range can be obtained without any increase in the number of times of the compression of the negative electrode active material layer compared to the case of the mass ratio of 70/30 or more, but charging/discharging cyclic characteristics are deteriorated.

The negative electrode active material may include other material that can reversibly intercalate and deintercalate lithium ions in addition to the graphite particles A and B used in the present embodiment, and specifically, may include, for example, a metal that can be alloyed with lithium, such as silicon (Si) and tin (Sn), or and an alloy or oxide that includes a metal element such as Si or Sn. If the content of the other material is large, the preventing effect on deterioration in charging/discharging cyclic characteristics of the non-aqueous electrolyte secondary battery may not be provided sufficiently, and thus, the content of the other material is desirably 10 mass % or less based on the mass of the negative electrode active material, for example.

Examples of the binder include a fluororesin, PAN, a polyimide resin, an acrylic resin, a polyolefin resin, styrene-butadiene rubber (SBR), carboxymethyl cellulose (CMC) or a salt thereof, polyacrylic acid (PAA) or a salt thereof (e.g., PAA-Na and PAA-K which may be a partially neutralized salt), and polyvinyl alcohol (PVA). These may be used singly or in combinations of two or more thereof

[Positive Electrode]

The positive electrode 11 comprises metal foil or the like as a positive electrode current collector and a positive electrode active material layer formed on the positive electrode current collector. As the positive electrode current collector, foil of a metal that is stable in the electric potential range of the positive electrode, such as aluminum, a film with such a metal disposed as an outer layer, or the like may be used. The positive electrode active material layer includes, for example, a positive electrode active material, a binder, a conductive agent, and other components.

For example, the positive electrode 11 can be produced by applying a positive electrode mixture slurry including a positive electrode active material, a binder, a conductive agent, and other components to a positive electrode current collector, drying the resultant coatings to form positive electrode active material layers, and then carrying out compression by compressing the positive electrode active material layers with a mill roll or the like.

Examples of the positive electrode active material include a lithium/transition metal oxide, which contains a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or two or more thereof may be mixed and used. The positive electrode active material preferably include a lithium/nickel complex oxide such as $Li_xNiO_2$, $Li_xCo_yNi_{1-y}O_2$, $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$), in view of obtaining a high capacity of a non-aqueous electrolyte secondary battery.

Examples of the conductive agent include carbon particles such as carbon black (CB), acetylene black (AB), Ketjen-black, and graphite. These may be used singly or in combinations of two or more thereof.

Examples of the binder include fluororesins, such as polytetrafluoroethylene (PTFE) and poly(vinylidene fluoride) (PVdF), polyacrylonitrile (PAN), polyimide resins, acrylic resins, and polyolefin resins. These may be used singly or in combinations of two or more thereof.

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a surface of the separator to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Example of the non-aqueous solvent to be used include esters, ethers, nitriles such as acetonitrile, amides such as dimethylformamide, and mixed solvents of two or more thereof. The non-aqueous solvent may include a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1 \leq x \leq 6$, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)F_2)$; and imide salts such as $LiN(SO_2CF_3)_2$ and $LiN(C_lF_{2l-1}SO_2)(C_mF_{2m+1}SO_2)$ (where l and m are integers of 1 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per L of solvent.

EXAMPLES

Hereinafter, the present disclosure will be described in more details by way of Examples, but the present disclosure is not limited thereby.

Example 1

[Production of Positive Electrode]

90 parts by mass of lithium cobalt oxide as a positive electrode active material, 5 parts by mass of graphite as a conductive agent, and 5 parts by mass of a powder of poly(vinylidene fluoride) as a binder were mixed, and an adequate amount of N-methyl-2-pyrrolidone (NMP) was further added thereto to prepare a positive electrode mixture slurry. This slurry was applied to both sides of aluminum foil (thickness: 15 μm) as a current collector by doctor blade method, and the coatings were dried and then compressed with a mill roll, to thereby produce a positive electrode having positive electrode active material layers formed on the both respective sides of the positive electrode current collector.

[Production of Graphite Particles A]

Coke was crushed to an average particle size (median diameter D50) of 15 μm. Pitch as a binder was added to the crushed coke, and the coke was allowed to aggregate to an average particle size (median diameter D50) of 17 μm. This aggregate was fired at a temperature of 2800° C. for graphitization, and sieving the graphitized product was then carried out with 250-mesh sieve to obtain graphite particles A having an average particle size (median diameter D50) of 23 μm.

[Production of Graphite Particles B]

Coke was crushed to an average particle size (median diameter D50) of 15 μm. Pitch as a binder was added to the crushed coke to aggregate, and an isotropic pressure was then applied to the resultant to form a molded product having a block shape and a density of 1.6 $g/cm^3$ to 1.9 $g/cm^3$. The molded product having a block shape was fired at a temperature of 2800° C. for graphitization, and the resulting molded product having a block shape was crushed. Sieving the crushed product was carried out with 250-mesh sieve to obtain graphite particles B having an average particle size (median diameter D50) of 23 μm.

[Production of Negative Electrode]

The graphite particles A and the graphite particles B were mixed in a mass ratio, graphite particles A/graphite particles B, of 70/30. The mixture was used as a negative electrode active material. The negative electrode active material, sodium carboxymethyl cellulose (CMC-Na), and a styrene-butadiene copolymer rubber (SBR) were mixed in a mass ratio, negative electrode active material: CMC-Na: SBR, of 100:1:1 to prepare a negative electrode mixture slurry. This slurry was applied to both sides of copper foil as a current collector by doctor blade method, and the coatings were dried and then compressed once with a mill roll to a predetermined thickness, to thereby produce a negative electrode having negative electrode active material layers formed on the both respective sides of a negative electrode current collector. On the produced negative electrode, the porosity due to closed pores of the graphite particles A and that of the graphite particles B were determined, and found to be 1% and 8%, respectively. The determination methods were described hereinbefore and are omitted here. Each of the negative electrode active material layers formed on the both respective sides of a negative electrode current collector had a packing density of 1.5 $g/cm^3$. In other words, the number of times of the compression necessary for obtaining the above-described packing density was one.

[Production of Non-Aqueous Electrolyte]

Ethylene carbonate (EC), propylene carbonate (PC), and ethyl methyl carbonate (EMC) were mixed in a volume ratio of 10:10:80, and $LiPF_6$ was dissolved in the resulting mixed non-aqueous solvent to a concentration of 1.0 mol/L. The resulting product was used as a non-aqueous electrolyte.

[Production of Non-Aqueous Electrolyte Secondary Battery]

(1) The above-described positive electrode and negative electrode were wound together with a microporous polyethylene film interposed therebetween as a separator to produce an electrode assembly, and the electrode assembly was then pressed to make a flat wound electrode assembly.

(2) A laminate material in a sheet form having a five-layer structure, specifically, polypropylene resin layer/adhesive layer/aluminum alloy layer/adhesive layer/polypropylene resin layer, was provided. The laminate material was turned up to form a bottom portion, thereby forming a space in the form of a cup for housing an electro assembly. The resultant was used as a package of a battery.

(3) In an argon atmosphere in a glove box, the above-described electrode assembly and non-aqueous electrolyte were housed in the housing space of the package, and then, the inside of the package was decompressed to impregnate the separator with the non-aqueous electrolyte. The opening of the package was sealed to produce a non-aqueous electrolyte secondary battery having a height of 62 mm, a width of 35 mm, and a thickness of 3.6 mm.

Example 2

In production of graphite particles B, the same conditions as in Example 1 were applied, except that the amount of pitch was increased compared to Example 1. A negative electrode was produced in the same manner as in Example 1, except that the above-described graphite particles B were used, and then a non-aqueous electrolyte secondary battery was produced. In the produced negative electrode, the porosity due to closed pores of the graphite particles A was found to be 1%, and that of the graphite particles B was found to be 15%. Each of the negative electrode active material layers formed on the both respective sides of a negative electrode current collector had a packing density of 1.5 $g/cm^3$. In other words, the number of times of the compression necessary for obtaining the above-described packing density was one.

Example 3

In production of graphite particles B, the same conditions as in Example 1 were applied, except that the amount of pitch was increased compared to Example 2. A negative electrode was produced in the same manner as in Example 1, except that the above-described graphite particles B were used, and then a non-aqueous electrolyte secondary battery was produced. In the produced negative electrode, the porosity due to closed pores of the graphite particles A was found to be 1%, and that of the graphite particles B was found to be 20%. Each of the negative electrode active material layers formed on the both respective sides of a negative electrode current collector had a packing density of 1.5 g/cm$^3$. In other words, the number of times of the compression necessary for obtaining the above-described packing density was one.

Example 4

A negative electrode was produced in the same manner as in Example 1, except that the graphite particles A and B in Example 1 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 1%, and that of the graphite particles B was found to be 8%. Each of the negative electrode active material layers formed on the both respective sides of a negative electrode current collector had a packing density of 1.5 g/cm$^3$. In other words, the number of times of the compression necessary for obtaining the above-described packing density was one.

Example 5

A negative electrode was produced in the same manner as in Example 1, except that the graphite particles A in Example 1 and the graphite particles B in Example 2 were used, and that the mixture obtained by mixing them in a mass ratio, graphite particles A/graphite particles B, of 90/10, was used as a negative electrode active material, and then non-aqueous electrolyte secondary battery was produced. In the produced negative electrode, the porosity due to closed pores of the graphite particles A was found to be 1%, and that of the graphite panicles B was found to be 15%. Each of the negative electrode active material layers formed on the both respective sides of a negative electrode current collector had a packing density of 1.5 g/cm$^3$. In other words, the number of times of the compression necessary for obtaining the above-described packing density was one.

Example 6

A negative electrode was produced in the same manner as in Example 1, except that the graphite particles A in Example 1 and the graphite particles B in Example 3 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 1%, and that of the graphite panicles B was found to be 20%. Each of the negative electrode active material layers formed on the both respective sides of a negative electrode current collector had a packing density of 1.5 g/cm$^3$. In other words, the number of times of the compression necessary for obtaining the above-described packing density was one.

Example 7

In production of graphite particles A, the same conditions as in Example 1 were applied, except that the average particle size (median diameter D50) of the cokes after crushing was changed to 10 μm. A negative electrode was produced in the same manner as in Example 1, except that the above-described graphite particles A was used, and then a non-aqueous electrolyte secondary battery was produced. In the produced negative electrode, the porosity due to closed pores of the graphite particles A was found to be 5%, and that of the graphite particles B was found to be 8%. Each of the negative electrode active material layers formed on the both respective sides of a negative electrode current collector had a packing density of 1.5 g/cm$^3$. In other words, the number of times of the compression necessary for obtaining the above-described packing density was one.

Example 8

A negative electrode was produced in the same manner as in Example 1, except that the graphite particles A in Example 7 and the graphite particles B in Example 2 were used, and then a non-aqueous electrolyte secondary battery was produced. In the produced negative electrode, the porosity due to closed pores of the graphite particles A was found to be 5%, and that of the graphite particles B was found to be 15%. Each of the negative electrode active material layers formed on the both respective sides of a negative electrode current collector had a packing density of 1.5 g/cm$^3$, In other words, the number of times of the compression necessary for obtaining the above-described packing density was one.

Example 9

A negative electrode was produced in the same manner as in Example 1, except that the graphite particles A in Example 7 and the graphite particles B in Example 3 were used, and then a non-aqueous electrolyte secondary battery was produced. In the produced negative electrode, the porosity due to closed pores of the graphite particles A was found to be 5%, and that of the graphite particles B was found to be 20%. Each of the negative electrode active material layers formed on the both respective sides of a negative electrode current collector had a packing density of 1.5 g/cm$^3$. In other words, the number of times of the compression necessary for obtaining the above-described packing density was one.

Example 10

A negative electrode was produced in the same manner as in Example 1, except that the graphite particles A in Example 7 and the graphite particles B in Example 1 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 5%, and that of the graphite panicles B was found to be 8%. Each of the negative electrode active material layers formed on the both respective sides of a negative electrode current

Example 11

A negative electrode was produced in the same manner as in Example 1, except that the graphite particles A in Example 7 and the graphite particles B in Example 2 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 5%, and that of the graphite panicles B was found to be 15%. Each of the negative electrode active material layers formed on the both respective sides of a negative electrode current collector had a packing density of 1.5 g/cm³. In other words, the number of times of the compression necessary for obtaining the above-described packing density was one.

Example 12

A negative electrode was produced in the same manner as in Example 1, except that the graphite particles A in Example 7 and the graphite particles B in Example 3 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 5%, and that of the graphite panicles B was found to be 20%. Each of the negative electrode active material layers formed on the both respective sides of a negative electrode current collector had a packing density of 1.5 g/cm³. In other words, the number of times of the compression necessary for obtaining the above-described packing density was one.

Comparative Example 1

A negative electrode was produced in the same manner as in Example 1, except that only the graphite particles A produced in Example 1 were used as a negative electrode active material; however, the packing density of each of the negative electrode active material layers formed on the both respective sides of a negative electrode current collector did not reach 1.5 g/cm³. A non-aqueous electrolyte secondary battery was produced using this negative electrode, but the resulting battery did not function as a battery.

Then, in Comparative Example 1, only the graphite particles A produced in Example 1 were used as a negative electrode active material, and compression with a mill roll was carried out twice. On this occasion, the packing densities of the negative electrode active material layers reached 1.5 g/cm³, and this was used as a negative electrode of Comparative Example 1. In other words, the number of times of the compression necessary for obtaining the above-described packing density increased, and was two. On the produced negative electrode, the porosity due to closed pores of the graphite particles A was determined and found to be 1%. A non-aqueous electrolyte secondary battery was produced in the same manner as in Example 1, except that this negative electrode was used.

Comparative Example 2

A negative electrode was produced in the same manner as in Example 1, except that only the graphite particles A produced in Example 7 were used as a negative electrode active material; however, the packing density of each of the negative electrode active material layers formed on the both respective sides of a negative electrode current collector did not reach 1.5 g/cm³. A non-aqueous electrolyte secondary battery was produced using this negative electrode, but the resulting battery did not function as a battery.

Then, in Comparative Example 2, only the graphite particles A produced in Example 7 was used as a negative electrode active material, and compression with a mill roll was carried out twice. On this occasion, the packing densities of the negative electrode active material layers reached 1.5 g/cm³, and this was used as a negative electrode of Comparative Example 2. In other words, the number of times of the compression necessary for obtaining the above-described packing density increased, and was two. On the produced negative electrode, the porosity due to closed pores of the graphite particles A was determined and found to be 5%. A non-aqueous electrolyte secondary battery was produced in the same manner as in Example 1, except that this negative electrode was used.

Comparative Example 3

A negative electrode was produced in the same manner as in Example 1, except that only the graphite particles B produced in Example 1 were used as a negative electrode active material, and then a non-aqueous electrolyte secondary battery was produced. In the produced negative electrode, the porosity due to closed pores of the graphite particles B was found to be 8%. Each of the negative electrode active material layers formed on the both respective sides of a negative electrode current collector had a packing density of 1.5 g/cm³. In other words, the number of times of the compression necessary for obtaining the above-described packing density was one.

Comparative Example 4

In production of graphite particles B, the same conditions as in Example 1 were applied, except that the amount of pitch was increased compared to that in Example 1. A negative electrode was produced in the same manner as in Example 1, except that only the above-described graphite particles B were used as a negative electrode active material, and then a non-aqueous electrolyte secondary battery was produced. In the produced negative electrode, the porosity due to closed pores of the graphite particles B was found to be 10%. Each of the negative electrode active material layers formed on the both respective sides of a negative electrode current collector had a packing density of 1.5 g/cm³. In other words, the number of times of the compression necessary for obtaining the above-described packing density was one.

Comparative Example 5

In production of graphite particles B, the same conditions as in Example 1 were applied, except that the amount of pitch was increased compared to Comparative Example 4. A negative electrode was produced in the same manner as in Example 1, except that only the above-described graphite particles B were used as a negative electrode active material, and then a non-aqueous electrolyte secondary battery was produced. In the produced negative electrode, the porosity due to closed pores of the graphite particles B was found to be 13%. Each of the negative electrode active material layers formed on the both respective sides of a negative electrode current collector had a packing density of 1.5 g/cm³. In other words, the number of times of the compression necessary for obtaining the above-described packing density was one.

Comparative Example 6

A negative electrode was produced in the same manner as in Example 1, except that only the graphite particles B produced in Example 2 was used as a negative electrode active material, and then a non-aqueous electrolyte secondary battery was produced. It is noted that the amount of pitch used for producing the graphite particles in Example 2 was larger than that in Comparative Example 5. In the produced negative electrode, the porosity due to closed pores of the graphite particles B was found to be 15%, Each of the negative electrode active material layers formed on the both respective sides of a negative electrode current collector had a packing density of 1.5 g/cm³. In other words, the number of times of the compression necessary for obtaining the above-described packing density was one.

Comparative Example 7

A negative electrode was produced in the same manner as in Example 1, except that only the graphite particles B produced in Example 3 was used as a negative electrode active material, and then a non-aqueous electrolyte secondary battery was produced. In the produced negative electrode, the porosity due to closed pores of the graphite particles B was found to be 20%. Each of the negative electrode active material layers formed on the both respective sides of a negative electrode current collector had a packing density of 1.5 g/cm³. In other words, the number of times of the compression necessary for obtaining the above-described packing density was one.

Comparative Example 8

In production of graphite particles B, the same conditions as in Example 1 were applied, except that the amount of pitch was increased compared to that in Comparative Example 7. A negative electrode was produced in the same manner as in Example 1, except that only the above-described graphite particles B were used as a negative electrode active material, and then a non-aqueous electrolyte secondary battery was produced. In the produced negative electrode, the porosity due to closed pores of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing density was one.

Comparative Example 9

A negative electrode was produced in the same manner as in Example 1, except that the graphite particles A and the graphite particles B both in Example 1 were used, and that the mixture obtained by mixing them in a mass ratio, graphite particles A/graphite particles B, of 10/90, was used as a negative electrode active material, and then a non-aqueous electrolyte secondary battery was produced. In the produced negative electrode, the porosity due to closed pores of the graphite particles A was found to be 1%, and that of the graphite particles B was found to be 8%. Each of the negative electrode active material layers formed on the both respective sides of a negative electrode current collector had a packing density of 1.5 g/cm³. In other words, the number of times of the compression necessary for obtaining the above-described packing density was one.

Comparative Example 10

A negative electrode was produced in the same manner as in Example 1, except that the graphite particles A in Example 1 and the graphite particles B in Example 2 were used, and that the mixture obtained by mixing them in a mass ratio, graphite particles A/graphite particles B, of 10/90, was used as a negative electrode active material, and then a non-aqueous electrolyte secondary battery was produced. In the produced negative electrode, the porosity due to closed pores of the graphite particles A was found to be 1%, and that of the graphite particles B was found to be 15%. Each of the negative electrode active material layers formed on the both respective sides of a negative electrode current collector had a packing density of 1.5 g/cm³. In other words, the number of times of the compression necessary for obtaining the above-described packing density was one.

Comparative Example 11

A negative electrode was produced in the same manner as in Example 1, except that the graphite particles A in Example 1 and the graphite particles B in Example 3 were used, and that the mixture obtained by mixing them in a mass ratio, graphite particles A/graphite particles B, of 10/90, was used as a negative electrode active material, and then a non-aqueous electrolyte secondary battery was produced. In the produced negative electrode, the porosity due to closed pores of the graphite particles A was found to be 1%, and that of the graphite particles B was found to be 20%. Each of the negative electrode active material layers formed on the both respective sides of a negative electrode current collector had a packing density of 1.5 g/cm³. In other words, the number of times of the compression necessary for obtaining the above-described packing density was one.

Comparative Example 12

A negative electrode was produced in the same manner as in Example 1, except that the graphite particles A in Example 1 and the graphite particles B in Comparative Example 9 were used, and that the mixture obtained by mixing them in a mass ratio, graphite particles A/graphite particles B, of 10/90, was used as a negative electrode active material, and then a non-aqueous electrolyte secondary battery was produced. In the produced negative electrode, the porosity due to closed pores of the graphite particles A was found to be 1%, and that of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing dens was one.

Comparative Example 13

A negative electrode was produced in the same manner as in Example 1, except that the graphite particles A and the graphite particles B both in Example 1 were used, and that the mixture obtained by mixing them in a mass ratio, graphite particles A/graphite particles B, of 30/70, was used as a negative electrode active material, and then a non-aqueous electrolyte secondary battery was produced. In the produced negative electrode, the porosity due to closed pores of the graphite particles A was found to be 1%, and that of the graphite particles B was found to be 8%. Each of the negative electrode active material layers formed on the both respective sides of a negative electrode current collector had a packing density of 15 g/cm$^3$. In other words, the number of times of the compression necessary for obtaining the above-described packing density was one.

Comparative Example 14

A negative electrode was produced in the same manner as in Example 1, except that the graphite particles A in Example 1 and the graphite particles B in Example 2 were used, and that the mixture obtained by mixing them in a mass ratio, graphite particles A/graphite particles B, of 30/70, was used as a negative electrode active material, and then a non-aqueous electrolyte secondary battery was produced. In the produced negative electrode, the porosity due to closed pores of the graphite particles A was found to be 1%, and that of the graphite panicles B was found to be 15%. Each of the negative electrode active material layers formed on the both respective sides of a negative electrode current collector had a packing density of 15 g/cm$^3$. In other words, the number of times of the compression necessary for obtaining the above-described packing density was one.

Comparative Example 15

A negative electrode was produced in the same manner as in Example 1, except that the graphite particles A in Example 1 and the graphite particles B in Example 3 were used, and that the mixture obtained by mixing them in a mass ratio, graphite particles A/graphite particles B, of 30/70, was used as a negative electrode active material, and then a non-aqueous electrolyte secondary battery was produced. In the produced negative electrode, the porosity due to closed pores of the graphite particles A was found to be 1%, and that of the graphite panicles B was found to be 20%. Each of the negative electrode active material layers formed on the both respective sides of a negative electrode current collector had a packing density of 1.5 g/cm$^3$. In other words, the number of times of the compression necessary for obtaining the above-described packing density was one.

Comparative Example 16

A negative electrode was produced in the same manner as in Example 1, except that the graphite particles A in Example 1 and the graphite particles B in Comparative Example 9 were used, and that the mixture obtained by mixing them in a mass ratio, graphite particles A/graphite particles B, of 30/70, was used as a negative electrode active material, and then a non-aqueous electrolyte secondary battery was produced. In the produced negative electrode, the porosity due to closed pores of the graphite particles A was found to be 1%, and that of the graphite particles B was found to be 25%. Each of the negative electrode active material layers formed on the both respective sides of a negative electrode current collector had a packing density of 1.5 g/cm$^3$. In other words, the number of times of the compression necessary for obtaining the above-described packing density was one.

Comparative Example 17

A negative electrode was produced in the same manner as in Example 1, except that the graphite particles A and the graphite particles B both in Example 1 were used, and that the mixture obtained by mixing them in a mass ratio, graphite particles A/graphite particles B, of 50/50, was used as a negative electrode active material, and then a non-aqueous electrolyte secondary battery was produced. In the produced negative electrode, the porosity due to closed pores of the graphite particles A was found to be 1%, and that of the graphite particles B was found to be 8%. Each of the negative electrode active material layers formed on the both respective sides of a negative electrode current collector had a packing density of 15 g/cm$^3$. In other words, the number of times of the compression necessary for obtaining the above-described packing density was one.

Comparative Example 18

A negative electrode was produced in the same manner as in Example 1, except that the graphite particles A in Example 1 and the graphite particles B in Example 2 were used, and that the mixture obtained by mixing them in a mass ratio, graphite particles A/graphite particles B, of 50/50, was used as a negative electrode active material, and then a non-aqueous electrolyte secondary battery was produced. In the produced negative electrode, the porosity due to closed pores of the graphite particles A was found to be 1%, and that of the graphite particles B was found to be 15%. Each of the negative electrode active material layers formed on the both respective sides of a negative electrode current collector had a packing density of 1.5 g/cm$^3$. In other words, the number of times of the compression necessary for obtaining the above-described packing density was one.

Comparative Example 19

A negative electrode was produced in the same manner as in Example 1, except that the graphite particles A in Example 1 and the graphite particles B in Example 3 were used, and that the mixture obtained by mixing them in a mass ratio, graphite particles A/graphite particles B, of 50/50, was used as a negative electrode active material, and then a non-aqueous electrolyte secondary battery was produced. In the produced negative electrode, the porosity due to closed pores of the graphite particles A was found to be 1%, and that of the graphite particles B was found to be 20%. Each of the negative electrode active material layers formed on the both respective sides of a negative electrode current collector had a packing density of 1.5 g/cm$^3$. In other words, the number of times of the compression necessary for obtaining the above-described packing density was one.

Comparative Example 20

A negative electrode was produced in the same manner as in Example 1, except that the graphite particles A in Example 1 and the graphite particles B in Comparative Example 9 were used, and that the mixture obtained by mixing them in a mass ratio, graphite particles A/graphite particles B, of 50/50, was used as a negative electrode active material, and then a non-aqueous electrolyte secondary battery was produced. In the produced negative electrode, the porosity due to closed pores of the graphite particles A was found to be 1%, and that of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing density was one.

Comparative Example 21

A negative electrode was produced in the same manner as in Example 1, except that the graphite particles A in Example 1 and the graphite particles B in Comparative Example 9 were used, and that the mixture obtained by mixing them in a mass ratio, graphite particles A/graphite particles B, of 70/30, was used as a negative electrode active material, and then a non-aqueous electrolyte secondary battery was produced. In the produced negative electrode, the porosity due to closed pores of the graphite particles A was found to be 1%, and that of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing density was one.

Comparative Example 22

A negative electrode was produced in the same manner as in Example 1, except that the graphite particles A in Example 1 and the graphite particles B in Comparative Example 8 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 1%, and that of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing density was one.

Comparative Example 23

A negative electrode was produced in the same manner as in Example 1, except that the graphite particles A in Example 7 and the graphite particles B in Comparative Example 8 were used, and that the mixture obtained by mixing them in a mass ratio, graphite particles A/graphite particles B, of 70/30, was used as a negative electrode active material, and then a non-aqueous electrolyte secondary battery was produced. In the produced negative electrode, the porosity due to closed pores of the graphite particles A was found to be 5%, and that of the graphite particles B was found to be 25%. Each of the negative electrode active material layers formed on the both respective sides of a negative electrode current collector had a packing density of 1.5 g/cm³. In other words, the number of times of the compression necessary for obtaining the above-described packing density was one.

Comparative Example 24

A negative electrode was produced in the same manner as in Example 1, except that the graphite particles A in Example 7 and the graphite particles B in Comparative Example 8 were used, and that the mixture obtained by mixing them in a mass ratio, graphite particles A/graphite particles B, of 90/10, was used as a negative electrode active material, and then a non-aqueous electrolyte secondary battery was produced. In the produced negative electrode, the porosity due to closed pores of the graphite particles A was found to be 5%, and that of the graphite particles B was found to be 25%. The negative electrode active material layers formed on the both respective sides of a negative electrode current collector had a packing density of 1.5 g/cm³. In other words, the number of times of the compression necessary for obtaining the above-described packing density was one.

[Initial Efficiency]

At an environment temperature of 25° C., each of non-aqueous electrolyte secondary batteries according to Examples and Comparative Examples was charged at a constant current (current 1 It=800 mA, final voltage 4.3 V) and then charged at a constant voltage (voltage 4.3 V, final current 16 mA). Then, the battery was discharged at a constant current with a current value of 800 mA to a final voltage of 2.75 V, and further additionally discharged at 160 mA. The initial efficiency of each of non-aqueous electrolyte secondary batteries according to Examples and Comparative Examples was determined using the following equation.

Initial efficiency=(Discharge capacity/Charge capacity)×100

[Discharge Load Characteristics]

At an environment temperature of 25° C., each of non-aqueous electrolyte secondary batteries according to Examples and Comparative Examples was charged at a constant current of 800 mA to a final voltage of 4.3 V and then discharged at a constant current of 800 mA to a final voltage of 2.75 V. The discharge capacity at this time was defined as the 1 It-discharge capacity. At an environment temperature of 25° C. each of non-aqueous electrolyte secondary batteries according to Examples and Comparative Examples was charged at a constant current of 800 mA to a final voltage of 4.3 V and then discharged at a constant current of 2400 mA to a final voltage of 2.75 V. The discharge capacity at this time was defined as the 3 It-discharge capacity. The discharge load characteristics of each of non-aqueous electrolyte secondary batteries according to Examples and Comparative Examples was determined using the following equation.

Discharge load Characteristics=(3 It-Discharge capacity/1 It-Discharge capacity)×100

[Determination of Capacity Retention in Charging/Discharging Cycles]

Each non-aqueous electrolyte secondary battery in Examples and Comparative Examples were charged at a constant current (current 1 It=800 mA, final voltage 4.3 V), and then charged at a constant voltage (voltage 4.3 V, final current 16 mA). Thereafter, the battery was discharged at a constant current at a current value of 800 mA to a final voltage to 2.75 V. Such charging and discharging were regarded as one cycle, and 1000 cycles were conducted. The capacity retention of each non-aqueous electrolyte secondary battery in Examples and Comparative Examples in the charging/discharging cycles was determined by the following equation.

Capacity Retention=(Discharge Capacity in 1000th Cycle/Discharge Capacity in First Cycle)×100

Table 1 shows the results of the number of times of compression in manufacturing the negative electrode in Examples and Comparative Examples, and the initial efficiency, the discharge load characteristics, and the capacity retention in the charging/discharging cycles of each of non-aqueous electrolyte secondary batteries according to Examples and Comparative Examples. A larger value of the capacity retention in the charging/discharging cycles indicates that deterioration in charging/discharging cycle characteristics was prevented more.

TABLE 1

| | Graphite Particles A Porosity due to closed pores | Graphite Particles B Porosity due to closed pores | Graphite Particles A/ Graphite Particles B | Number of Times of Compression | Initial Efficiency | Load Characteristics | Capacity Retention |
|---|---|---|---|---|---|---|---|
| Comparative Example 1 | 1% | — | 100/0 | 2 | 94.9% | 86% | 67% |
| Comparative Example 2 | 5% | — | 100/0 | 2 | 94.9% | 81% | 65% |
| Comparative Example 3 | — | 8% | 0/100 | 1 | 94.0% | 80% | 60% |
| Comparative Example 4 | — | 10% | 0/100 | 1 | 93.8% | 79% | 58% |
| Comparative Example 5 | — | 13% | 0/100 | 1 | 93.7% | 79% | 58% |
| Comparative Example 6 | — | 15% | 0/100 | 1 | 93.5% | 78% | 54% |
| Comparative Example 7 | — | 20% | 0/100 | 1 | 93.3% | 78% | 48% |
| Comparative Example 8 | — | 25% | 0/100 | 1 | 92.7% | 78% | 47% |
| Comparative Example 9 | 1% | 8% | 10/90 | 1 | 93.9% | 80% | 59% |
| Comparative Example 10 | 1% | 15% | 10/90 | 1 | 93.8% | 79% | 55% |
| Comparative Example 11 | 1% | 20% | 10/90 | 1 | 93.8% | 79% | 52% |
| Comparative Example 12 | 1% | 25% | 10/90 | 1 | 93.5% | 78% | 48% |
| Comparative Example 13 | 1% | 8% | 30/70 | 1 | 93.9% | 81% | 60% |
| Comparative Example 14 | 1% | 15% | 30/70 | 1 | 93.8% | 79% | 55% |
| Comparative Example 15 | 1% | 20% | 30/70 | 1 | 93.8% | 78% | 53% |
| Comparative Example 16 | 1% | 25% | 30/70 | 1 | 93.6% | 78% | 48% |
| Comparative Example 17 | 1% | 8% | 50/50 | 1 | 94.0% | 82% | 60% |
| Comparative Example 18 | 1% | 15% | 50/50 | 1 | 93.9% | 80% | 59% |
| Comparative Example 19 | 1% | 20% | 50/50 | 1 | 93.8% | 79% | 55% |
| Comparative Example 20 | 1% | 25% | 50/50 | 1 | 93.7% | 78% | 48% |
| Example 1 | 1% | 8% | 70/30 | 1 | 94.4% | 87% | 75% |
| Example 2 | 1% | 15% | 70/30 | 1 | 94.2% | 83% | 73% |
| Example 3 | 1% | 20% | 70/30 | 1 | 94.0% | 81% | 64% |
| Comparative Example 21 | 1% | 25% | 70/30 | 1 | 93.9% | 80% | 58% |
| Example 4 | 1% | 8% | 90/10 | 1 | 94.8% | 90% | 82% |
| Example 5 | 1% | 15% | 90/10 | 1 | 94.5% | 87% | 77% |
| Example 6 | 1% | 20% | 90/10 | 1 | 94.3% | 82% | 66% |
| Comparative Example 22 | 1% | 25% | 90/10 | 1 | 93.7% | 80% | 59% |
| Example 7 | 5% | 8% | 70/30 | 1 | 94.2% | 81% | 68% |
| Example 8 | 5% | 15% | 70/30 | 1 | 94.1% | 81% | 64% |
| Example 9 | 5% | 20% | 70/30 | 1 | 94.1% | 80% | 62% |
| Comparative Example 23 | 5% | 25% | 70/30 | 1 | 93.8% | 79% | 56% |
| Example 10 | 5% | 8% | 90/10 | 1 | 94.5% | 88% | 77% |
| Example 11 | 5% | 15% | 90/10 | 1 | 94.4% | 86% | 71% |
| Example 12 | 5% | 20% | 90/10 | 1 | 94.1% | 82% | 62% |
| Comparative Example 24 | 5% | 25% | 90/10 | 1 | 93.6% | 80% | 58% |

As clear from Table 1, the number of times of compression in manufacturing the negative electrode was one, which gave a negative electrode active material layer having a high packing density, in all of Examples 1 to 12. In addition, the capacity retention in the charging/discharging cycles was improved in all of Examples 1 to 12 as compared to Comparative Examples 3 to 24. Thus, when a negative electrode active material is used that is obtained by mixing graphite particles A having a porosity due to closed pores of 5% or less and graphite particles B having a porosity due to closed pores of 8% to 20% in a mass ratio between the graphite particles A and the graphite particles B of 70:30 to 90:10, there can be provided a non-aqueous electrolyte secondary battery that can be produced without an increase in the number of times of the compression in manufacturing a negative electrode thereof and can also achieve suppression of deterioration in charging/discharging cyclic characteristics.

REFERENCE SIGNS LIST

10 non-aqueous electrolyte secondary battery
11 positive electrode
12 negative electrode
13 separator
14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 graphite particle
34 closed pore
36 open pore

The invention claimed is:

1. A non-aqueous electrolyte secondary battery comprising a negative electrode having a negative electrode active material layer, the negative electrode active material layer including graphite particles A and graphite particles B each as a negative electrode active material,
   wherein the graphite particles A have a porosity due to closed pores of 1% to 5%, and the graphite particles B have a porosity due to closed pores of 8% to 15%, and
   a mass ratio between the graphite particles A and the graphite particles B is 70:30 to 90:10.

2. The non-aqueous electrolyte secondary battery according to claim 1, wherein the negative electrode active material layer has a packing density of 1.2 $g/cm^3$ to 1.7 $g/cm^3$.

* * * * *